(12) United States Patent
Thorogood (10) Patent No.: US 9,796,162 B2
(45) Date of Patent: Oct. 24, 2017

(54) NFC CARD MANUFACTURING

(71) Applicant: MOO PRINT LIMITED, London (GB)

(72) Inventor: Paul Thorogood, London (GB)

(73) Assignee: MOO PRINT LIMITED, London (GB)

( * ) Notice: Subject to any disclaimer, the term of this patent is extended or adjusted under 35 U.S.C. 154(b) by 0 days.

(21) Appl. No.: 14/783,696

(22) PCT Filed: Apr. 10, 2014

(86) PCT No.: PCT/GB2014/051132
§ 371 (c)(1),
(2) Date: Oct. 9, 2015

(87) PCT Pub. No.: WO2014/167344
PCT Pub. Date: Oct. 16, 2014

(65) Prior Publication Data
US 2016/0059532 A1    Mar. 3, 2016

(30) Foreign Application Priority Data

Apr. 10, 2013   (GB) ................... 1306552.9

(51) Int. Cl.
*G06K 19/06* (2006.01)
*B32B 37/02* (2006.01)
(Continued)

(52) U.S. Cl.
CPC .............. *B32B 37/02* (2013.01); *B32B 37/12* (2013.01); *B32B 38/145* (2013.01);
(Continued)

(58) Field of Classification Search
CPC .......... B32B 2309/105; B32B 2425/00; B32B 37/0053; B32B 38/145; B31D 1/028
See application file for complete search history.

(56) References Cited

U.S. PATENT DOCUMENTS 7,249,819 B2 *   7/2007   Burdette ............... B41J 29/393
                                                        347/19
2003/0136503 A1 *   7/2003   Green ................ B32B 38/0004
                                                        156/264
(Continued)

FOREIGN PATENT DOCUMENTS

CN       1 744 108 A      3/2006
DE   10 2005 054130 A1    5/2007
(Continued)

OTHER PUBLICATIONS

GB Patent Examination Report dated Jan. 18, 2016 as received in Application No. 1306552.9.

*Primary Examiner* — Thien M Le
*Assistant Examiner* — Asifa Habib
(74) *Attorney, Agent, or Firm* — Maschoff Brennan (57) ABSTRACT

A multiple ply printed product and a method of producing it are described. The method comprises providing a substrate layer having a first surface supporting at least one wireless communication chip and a second surface, reverse to the first surface. A first paper stock having a first surface and a second surface is also provided. A first bonding operation is performed to substantially bond together the first surface of the substrate layer and the second surface of the first paper stock, to sandwich the wireless communication chip between the first paper stock and the substrate layer; providing a second paper stock having a first surface and a second surface. At least one of the first surface of the first paper stock and the second surface of the second paper stock may be printed on. A second bonding operation is performed to bond together the first surface of the second paper stock and the second surface of the substrate layer, to form a multiple ply printed product where the first surface of the substrate layer supports a plurality of wireless communication chips and the multiple ply printed product is a sheet on
(Continued)

which is printed a plurality of business cards, each business card corresponding to a respective wireless communication chip.

17 Claims, 7 Drawing Sheets (51) Int. Cl.
*B32B 37/12* (2006.01)
*B32B 38/00* (2006.01)
*B42D 15/00* (2006.01)
*B42D 15/02* (2006.01)
*G06K 19/077* (2006.01)
*G06K 19/07* (2006.01)
*B42D 25/47* (2014.01)
*B42D 25/485* (2014.01)

(52) U.S. Cl.
CPC ......... *B42D 15/0093* (2013.01); *B42D 15/02* (2013.01); *G06K 19/072* (2013.01); *G06K 19/0723* (2013.01); *G06K 19/07718* (2013.01); *G06K 19/07722* (2013.01); *B32B 2305/342* (2013.01); *B32B 2317/12* (2013.01); *B32B 2425/00* (2013.01); *B32B 2519/02* (2013.01); *B42D 25/47* (2014.10); *B42D 25/485* (2014.10); *B42D 2033/28* (2013.01); *B42D 2033/46* (2013.01); *G06K 19/07716* (2013.01)

(56) References Cited

U.S. PATENT DOCUMENTS

| | | | |
|---|---|---|---|
| 2003/0178495 A1* | 9/2003 | Jones | B23C 5/10 235/492 |
| 2004/0144472 A1 | 7/2004 | Cowie | |
| 2006/0104689 A1* | 5/2006 | Marowski | B41J 3/44 400/76 |
| 2006/0181716 A1 | 8/2006 | Hoshina | |
| 2007/0075132 A1 | 4/2007 | Kean | |
| 2008/0266105 A1 | 10/2008 | Brod et al. | |
| 2010/0252637 A1 | 10/2010 | Bouchard | |
| 2013/0161382 A1* | 6/2013 | Bauer | G06K 1/121 235/375 |
| 2014/0227497 A1* | 8/2014 | Thorogood | B32B 7/12 428/211.1 |

FOREIGN PATENT DOCUMENTS

| | | |
|---|---|---|
| DE | 10 2006 019809 A1 | 10/2007 |
| EP | 0 698 859 A1 | 2/1996 |
| JP | 2003 231505 A | 8/2003 |
| JP | 2006 082438 A | 3/2006 |
| WO | 2007/088873 A1 | 8/2007 |
| WO | 2007/129102 A1 | 11/2007 |

* cited by examiner

Pattern writing

FIG. 10

Coordinate writing

NFC CARD MANUFACTURING

FIELD OF THE INVENTION

This invention relates to improvements to business cards and specifically to the inclusion of wireless communication chips (for example, NFC chips). In aspects, the invention relates to such business cards and to their manufacture and use.

BACKGROUND OF THE INVENTION

Traditionally, business cards have simply included information about the business card holder in printed form. More recently, it has become desirable to ensure that business card information can be easily transferred to the digital domain for use in electronic contact databases and similar electronic systems.

One solution is to scan-in the printed information on the business cards. However, if the digitised information is to be used effectively, such information needs to be interpreted and organised, especially if that information is to be searchable. Despite tools such as Optical Character Recognition, this method is very time consuming and error-prone.

Accordingly, to facilitate the transfer of business card information into the digital domain, a better solution is to enhance a conventional business card with explicit digital information. A 2-D barcode or other easily machine-readable glyph can be printed onto the card and used to provide digital information directly and/or provide a link (such as a URI) to a source of linked information. However, 2-D barcodes occupy valuable real-estate on the business card and can spoil the appearance of the business card making this solution less than ideal.

A more powerful approach that has been recently proposed is to provide a wireless communication chip, such as a Near Field Communication (NFC) chip, on the business card. NFC provides a set of short-range wireless technologies operating at 13.56 MHz according to a group of standards developed under the guidance of the NFC Forum. NFC chips are commercially available from a number of vendors. The NFC chip holds the relevant digital information, and this information can be very quickly transferred and processed. Furthermore, the information can be semantically structured, and so can be quickly and correctly merged into an electronic database.

NFC-enabled business cards have been proposed by a number of manufacturers. For example, Hicel produces a plastics material card with an integrated NFC chip and antenna. Nokia (http://www.nfc-hub.com) produces a paper card with an NFC tag sandwiched between two plies of paper. However, the manufacture of existing NFC-enabled business cards is expensive, inflexible and time-consuming. Furthermore, the incorporation of an NFC chip often detracts from the appearance and quality of high-grade business cards.

Accordingly, it is desirable to produce a paper-based business card which has NFC or other wireless capability while retaining in all practical respects the properties of a high-grade business card stock. It is also desirable to be able to produce and personalise such cards in volume, and to be able to use their enhanced capabilities to achieve new uses.

In particular, it is desirable to be able to produce NFC-enabled business cards which can be printed effectively with a digital press (for example, one of the digital presses in the HP Indigo product family). This is so as to enable manufacturing at high speed, high print quality and with sheet-to-sheet customisation.

It is against this background that the present invention has been conceived.

SUMMARY OF INVENTION

According to a first aspect of the present invention there is provided a method of producing a multiple ply printed product. Ideally, the method comprises at least one of the steps of:
providing a substrate layer having a first surface supporting at least one wireless communication chip and a second surface, reverse to the first surface;
providing a first paper stock having a first surface and a second surface;
performing a first bonding operation to substantially bond together the first surface of the substrate layer and the second surface of the first paper stock, thereby to sandwich the wireless communication chip between the first paper stock and the substrate layer;
providing a second paper stock having a first and second surface;
printing on at least one of: the first surface of the first paper stock and the second surface of the second paper stock; and
performing a second bonding operation to bond together, in registration, the first surface of the second paper stock and the second surface of the substrate layer to form a multiple ply printed product
wherein the first surface of the substrate layer supports a plurality of wireless communication chips and the multiple ply printed product is a sheet on which is printed a plurality of business cards, each business card corresponding to a respective wireless communication chip.

Advantageously, the sandwiching of the wireless communication chip between the first paper stock and the substrate layer protects the otherwise exposed wireless communication chip from damage during subsequent printing or bonding operations. This is done without overly sacrificing the flexibility and manageability of the first paper stock, enabling the use of a digital press.

Thus, the method is able to benefit from advantages derived through the use of a digital press in the creation of an end product which can otherwise be too thick or rigid to be handled by a digital press. In particular, the digital press can be used to print on to two printing sheets which can then be combined together afterwards to create a thicker and more rigid high quality multiple ply printed product. Specifically, the first bonding operation can effectively form a first printing sheet, having a printing surface defined by the first surface of the first paper stock and a non-printing surface defined by the second surface of the substrate layer. A second printing sheet can be effectively defined by the second paper stock. The first and second printing sheets can individually be processed by the digital press, and then can be combined together via the second bonding operation to create a thick, high quality multiple ply printed product—which itself may not be within the handling capabilities of the digital press.

Naturally, to create a product that is printed on both sides, it is preferable for the method to comprise printing onto both printing sheets before performing the second bonding operation.

Thus, it will be understood that the substrate layer needs to be thin and flexible enough to be processed by a typical digital printing press. Typically, the substrate layer is constructed from a film of plastics materials, such as polyethylene terephthalate (PET).

A further advantage of the method is that it can be split into two distinct stages; a first stage being used to produce the first and second printing sheets, and the second stage being used to print onto and bond together those first and second sheets. Accordingly, the first stage can take place at a fabrication plant, and the second stage, incorporating the printing step and the second bonding operation, can take place at a printing facility, incorporating a standard digital press as commonly known and used in the art. Moreover, a single fabrication plant can produce and distribute first and second sheets to many printing facilities enabling economies of scale to be realised. Accordingly, at the end of the first stage it is preferred that the first and second printing sheets are cut to a standard size suitable for handling by a standard digital press. The first and second printing sheets may be cut from respective first and second rolls formed during the first stage.

Preferably, the method further comprises applying a pressure-activated adhesive to at least one of the second surface of the substrate layer and the first surface of the second paper stock. Ideally, the second bonding operation comprises bonding together the first surface of the second paper stock and the second surface of the substrate layer under pressure. Ideally, the pressure-activated adhesive is activated at a pressure of at least 300 psi.

Advantageously, this allows the second bonding operation to be performed by pressing the substrate layer and the second paper stock together. This is particularly effective as an approach for printing a stack of multiple ply products. This approach can be used to print a stack of first sheets and second sheets in sequence, such that on bringing together the second surface of the substrate layer and the first surface of the second paper stock under pressure in registration the respective surfaces are bonded together to form a stack of bonded sheets. Moreover, this approach is particularly effective for preparing a stack of business cards. A plurality of discrete card stacks can be formed by the following approach. Each first surface is divided into a plurality of discrete card stack areas, and wherein after formation of the stack of bonded sheets the discrete card stack areas are separated to form a plurality of discrete card stacks.

Ideally, performing the first bonding operation comprises applying a fluid adhesive between the first surface of the substrate layer and the second surface of the first paper stock.

Ideally, performing the first bonding operation further comprises a handling operation so that the combination of the substrate layer, first paper stock and fluid adhesive has a substantially constant cross-sectional area.

Advantageously, the fluid adhesive is able to flow and set around the wireless communication chip, further protecting it. Furthermore, it will be appreciated that wireless communication chips (and other structures such as antennae) generally protrude from the underlying substrate by a not-insignificant amount, potentially causing irregularities in the surfaces sandwiching these structures. The fluid adhesive flows around such structures and so serves to even out the irregularities, thus improving the quality of the end product, and minimising printing flaws. Accordingly, it will be appreciated that the first surface of the substrate layer may support a one or more wireless communication chips and a one or more antennae, each wireless communication chip being connected to a respective antenna.

Ideally, the method further comprises forming a first printing sheet from the bonded substrate layer and first paper stock, the first printing sheet having a printing surface defined by the first surface of the first paper stock, and a non-printing surface defined by the second surface of the substrate layer. Ideally, the method comprises forming a second printing sheet from the second paper stock, the second printing sheet having a printing surface defined by the second surface of the second paper stock, and a non-printing surface defined by the first surface of the second paper stock. Ideally the first and/or second printing sheets are formed prior to the printing step.

Ideally, the first and second printing sheets are formed by cutting respective first and second rolls to a predetermined size. Ideally, the first and second printing sheets are of a common, predetermined size thereby to enable their bonding together in registration.

Ideally, the printing step is carried out by a digital press. Preferably, the first and second printing sheets are of a thickness suitable for handling by the digital press. Ideally, the formed multiple ply printed product is of a thickness beyond the handling capabilities of the digital press.

Ideally, the step of printing comprises printing, separately, onto the respective printing surfaces of the first and second printing sheets. Ideally, the second bonding operation comprises bonding together the non-printing surfaces of the first and second printing sheets.

Ideally, the method comprises providing a pressure-activated adhesive between or on the non-printing surfaces of the first and second printing sheets. Ideally, the method also comprises printing a stack of first and second printing sheet pairs in a sequence to orient the non-printing surfaces of each pair towards one another. Ideally, the method also comprises bringing the sheets of the stack into registration with one another. Ideally, the method further comprises applying pressure to the stack to bond each of the first and second printing sheet pairs to one another thereby to form a stack of bonded sheets.

Ideally, the method further comprises determining the location of the at least one wireless communication chip. Ideally, the method also comprises automatically controlling at least one method step in response to the determined location of the at least one wireless communication chip. For example, the method may further comprise printing on the first surface of the first paper stock at a position dependent on the determined location of the wireless communication chip. As another example, the method may comprise cutting and/or scoring the substrate layer at a position dependent on the determined location of the at least one wireless communication chip.

The determining the location of one or more wireless communication chips may be achieved through the use of a wireless reader/writer. Advantageously, this allows the location of a wireless communication chip to be automatically determined, even if it is sandwiched between the first paper stock and the substrate layer. The location of a wireless communication chip may be determined relative to automatically detectable features of the first paper stock, substrate layer and/or first printing sheet.

Accordingly, the detectable features and the wireless communication chip are ideally at predetermined positions relative to one another. For example, the location of the wireless communication chip can be determined relative to features such as one or more edges or boundaries of the substrate layer, first paper stock and/or first printing sheet.

Similarly, one or more position markers may be provided on the substrate layer, first paper stock and/or first printing sheet, and the location of a wireless communication chip can be determined relative to the one or more position markers.

As will be appreciated, a plurality of wireless communication chips may be supported on a common substrate layer. Accordingly, the location of one wireless communication chip can also be determined relative to another wireless communication chip on the common substrate layer.

In certain embodiments, the wireless communication chip will be one of the components of an "NFC tag", the other components being the substrate layer, and an antenna, as is known in the art. The NFC tag may be provided as part of an NFC stock, and the NFC stock may be prefabricated.

Also, as is well-known in the art, the antenna of an NFC tag is usually constructed of a thin metallic foil that is formed in a predetermined pattern on the surface of the underlying substrate via one of a number of prior known processes (for example, etching). To maximise the effectiveness of the antenna, the pattern is usually a coil occupying as much surface area as practicable. After the antenna pattern has been formed, the wireless communication chip is then bonded to the antenna to form an NFC tag.

As mentioned, many NFC tags may be formed on a common substrate layer during such a prefabrication process to create NFC stock. Traditionally, it is desirable to maximise the size and number of NFC tags supported by a common substrate so as to minimise substrate wastage. Accordingly, multiple NFC tags that are supported by a common substrate are frequently positioned relatively close together—i.e. the distance spacing the antennae of two adjacent NFC tags is generally of a similar order (or less) than the width or length of the area occupied by the antennae themselves. Similarly, the distance between an edge of the substrate and an antenna of an NFC tag is also generally less than the width or length of the area occupied by the antenna. However, in the context of the present invention, it can be beneficial to more widely space the NFC tags from one another and also the edges of the substrate layer.

Ideally, the one or more position markers may be provided on the substrate layer during the prefabrication of the substrate layer NFC stock. Advantageously, the one or more position markers may be formed on the same material as an antenna. For example, when the metallic material is deposited or etched onto the substrate layer in a series of patterns to form NFC antennae, the same metallic material can simultaneously form the one or more position markers.

The position markers may comprise metallic tabs which may be positioned close to an edge of the substrate layer or first paper stock. This facilitates automatic detection via metal detectors positioned at the border of a path followed by the first paper stock and/or the substrate layer during the production process.

Ideally, the first surface of the substrate layer supports a plurality of wireless communication chips. Ideally, the multiple ply printed product is a sheet on which a plurality of business cards is printed. Ideally, each business card corresponds to a respective wireless communication chip.

Ideally, each business card is printed at a location on the sheet corresponding to a determined location of a respective wireless communication chip. Ideally, the method further comprises separating each business card from the sheet.

Ideally, the method further comprises writing digital data to the or each wireless communication chip. Ideally, the digital data that is written to each of the plurality of wireless communication chips is specific to the business card to which that wireless communication chip relates.

According to a second aspect of the present invention there is provided a multiple ply printed product comprising at least three plies, wherein an internal ply of the card product supports at least one wireless communication chip. The product may be a business card, with the internal ply of the business card supporting no more than one wireless communication chip. The product may be a sheet of business cards. The product may be manufactured in accordance with the first aspect of the present invention.

In a third aspect, the invention provides a method of manufacturing business cards comprising: providing a sheet of card comprising a plurality of wireless communication chips at predetermined locations; printing a plurality of business cards on the sheet, each business card comprising no more than one wireless communication chip, writing digital information specific to that business card to the wireless communication chip of the business card, and separating the business cards in the sheet of card from each other.

In one preferred approach, the writing of digital information specific to a business card is carried out sheet-by-sheet. Preferably an identifier, such as a bar code, is provided for each sheet to allow determination of the sheet being written to. In one approach, the chips in one sheet are written to by matching readers and writers arrayed on a writing platform—shielding may be provided to prevent interference, contention or crosstalk between adjacent chips. Alternatively, the chips in one sheet are written to by writers operating in a predetermined sequence in order to preserve a minimum distance between writing operations—this approach is also effective to prevent interference. The chips in the sheet may also be provided with coordinate data representing the position of each chip in the sheet—this may be used in any of the writing methods described above. The coordinate data may also represent a sheet number or position in a sheet stack, in which case writing may take place simultaneously or in one process to chips in multiple sheets in a stack.

In a fourth aspect, the invention provides a paper product sheet comprising an array of wireless communication chips embedded in the sheet, wherein each of the wireless communication chips comprises a memory containing a coordinate representing a position of that wireless communication chip on the sheet. In one arrangement, the coordinate also represents a sheet number or position in a sheet stack.

In a fifth aspect, the invention provides a method of tracking uploading of digital data associated with a physical business card, comprising distributing a plurality of business cards each with a unique identifier stored in a memory of a wireless communication chip, wherein on reading of the wireless communication chip by a reader in a reading event, a network location is accessed to provide data relating to the reading event for access by a card distributor or business card provider. This data may identify one or more of a date, time, IP address or location and reading device or reading device type of the reading event. This data may be used to identify the times and places a specific card has been scanned, or to determine use statistics for the plurality of business cards, such as the overall conversion rate of the physical business cards into cards scanned in a reading event.

In a sixth aspect, the invention provides a method of using a business card to provide access to restricted information, the method comprising: providing an access key in a wireless communication chip of a business card identifying a card owner, providing the business card to a card recipient, the card recipient reading the access key from the wireless communication chip, and the card recipient using the access key to access remotely held data relating to the card owner.

It will be appreciated that the features and advantages of the different aspects of the present invention may be combined where context allows. Furthermore, it will also be appreciated that such features and advantages may themselves constitute further aspects of the present invention.

BRIEF DESCRIPTION OF FIGURES

Embodiments of the invention will now be described, by way of example, with reference to the accompanying Figures, of which.

DESCRIPTION OF SPECIFIC EMBODIMENTS

Figure 1:
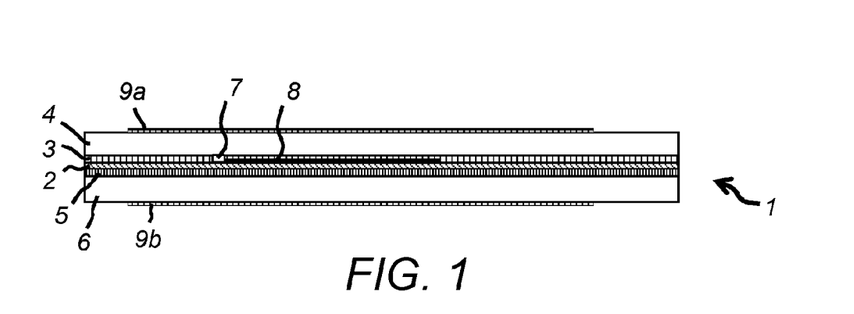
FIG. 1 shows a cross-sectional schematic view of a multiple ply product according to an embodiment of the invention.

FIG. 1 shows a cross-sectional schematic view of a multiple ply printed product—in this case, a business card—in accordance with an embodiment of the invention. The multiple ply product 1 comprises a first paper stock 4, a second paper stock 6, a PET substrate layer 2, a wireless communication chip 7 and its corresponding antenna 8. The first and second paper stocks 4, 6 support print 9a, 9b on their respective outwardly-facing surfaces. The first paper stock 4 and the substrate layer 2 are bonded together via a first adhesive layer 3, and the substrate layer 2 and the second paper stock 6 are bonded by a pressure-activated adhesive 5 as will be described in more detail below.

Figure 2:
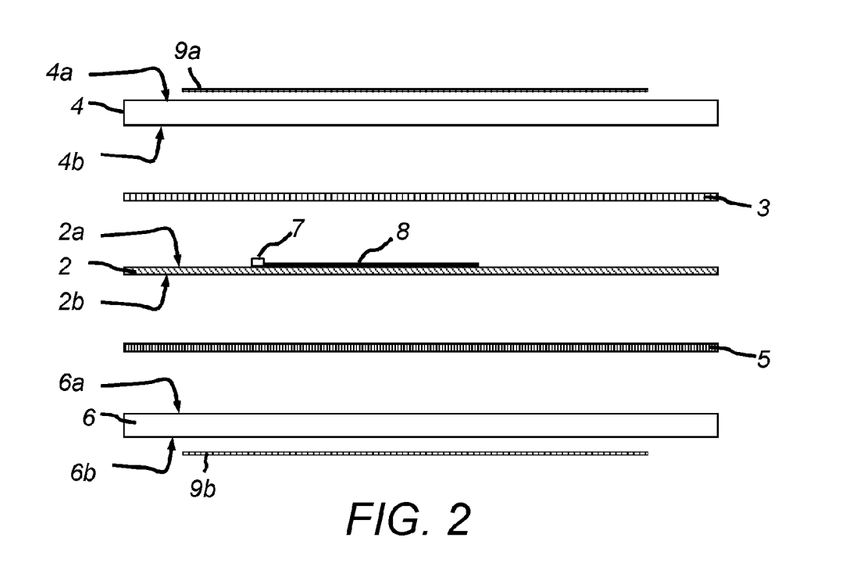
FIG. 2 shows an exploded view of the product of FIG. 1, with the different plies/layers separated for clarity.

FIG. 2 shows an exploded view of the product of FIG. 1, with the different plies/layers separated for clarity. In greater detail, the first paper stock 4 comprises: a first outer surface 4a which is able to support print 9a; and a second surface 4b bonded by fluid adhesive 3 to a first surface 2a of the substrate layer 2. The substrate layer 2 is part of an NFC tag prefabricated, as is known in the art, to support on the first surface 2a of the substrate layer 2 the wireless communication chip 7 and its corresponding antenna 8. The second surface 2b of the substrate layer 2 is bonded to a first surface 6a of the second paper stock 6 via the pressure-activated adhesive 5. The second outer surface 6b of the second paper stock is able to support print 9b.

In general, products of the type shown in FIG. 1 are produced in batches from rolls of material, which are processed and divided into printing sheets which are then run through a digital press for printing, combined and then subdivided into individual business cards 1, each business card 1 supporting a single wireless communication chip 7.

Figure 3:
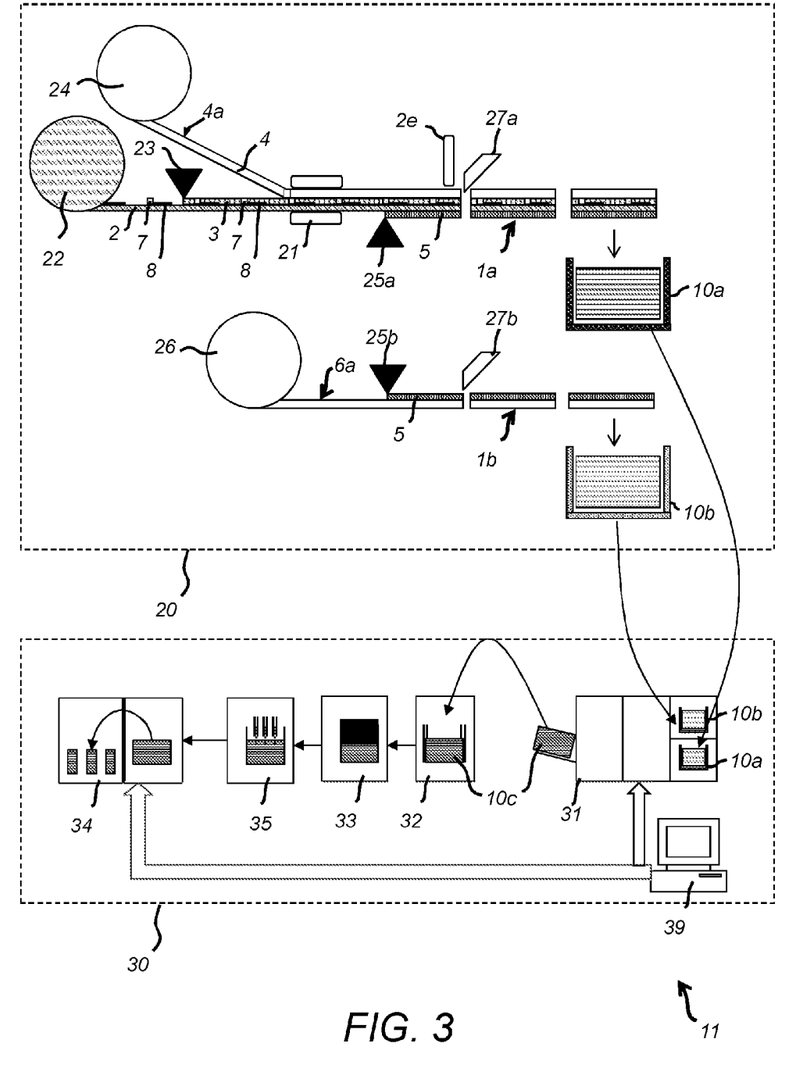
FIG. 3 is a schematic view of a system for producing a batch of products of the type shown in FIG. 1.
Figure 4:
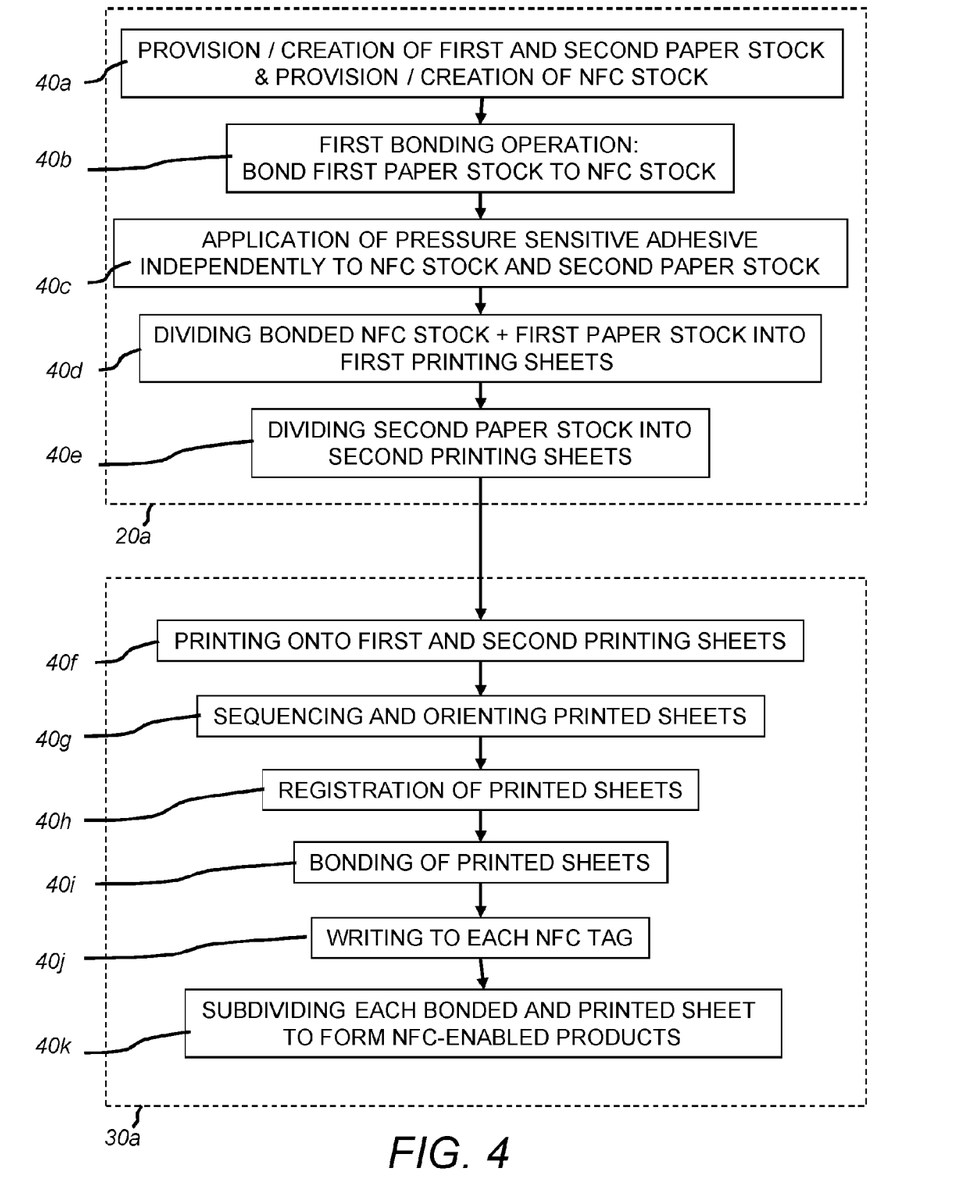
FIG. 4 is a flow diagram of the process steps carried out by the system of FIG. 3.

This process is described in greater detail with reference to FIGS. 3 and 4. FIG. 3 is a schematic view of a system 11 for producing a batch of business cards corresponding to the business card product 1 shown in FIG. 1. FIG. 4 is a flow diagram of the corresponding process steps 40a-40k of the system of FIG. 3. It will be appreciated by a person skilled in the art that not all these steps are necessarily required, or need to be performed in order, in all aspects of the invention. The process is split into two distinct stages; a first stage taking place at a stock fabrication plant 20 and the second stage taking place at a printing facility 30. Again, it will be appreciated by a person skilled in the art that the process steps may be carried out at a single facility, or be apportioned between different facilities in a way different to that as will be described.

The equipment and the processes involved in the manufacture of these business cards are similar to that disclosed in the Applicant's copending patent application number PCT/GB2012/000786 which describes the manufacture of a quadplex business card constructed from four combined plies of paper stock. The disclosure of this prior application is incorporated by reference herein to the extent permitted by applicable law.

The stock fabrication plant 20 includes the appropriate equipment to carry out the process 20a of converting stock in the form of rolls of material into sheets that are suitable for handing at the printing facility 30. Similarly, the printing facility 30 includes the appropriate equipment to carry out the process 30a of converting the sheets into NFC-enabled products 1.

Referring to FIG. 3, the rolls of material include a roll of the first paper stock 24, a roll of "NFC stock" 22 and a roll of second paper stock 26. The roll of the first paper stock 24 and the roll of NFC stock 22 are processed by a first processing line to create a stack 10a of first printing sheets 1a, and the roll of the second paper stock 26 is processed by a second processing line to create stack 10b of second printing sheets 1b.

For the avoidance of doubt, the roll of NFC stock 22 includes a common PET substrate layer 2 that supports a plurality of wireless communication chips 7 and their corresponding antennae 8.

Figure 5:
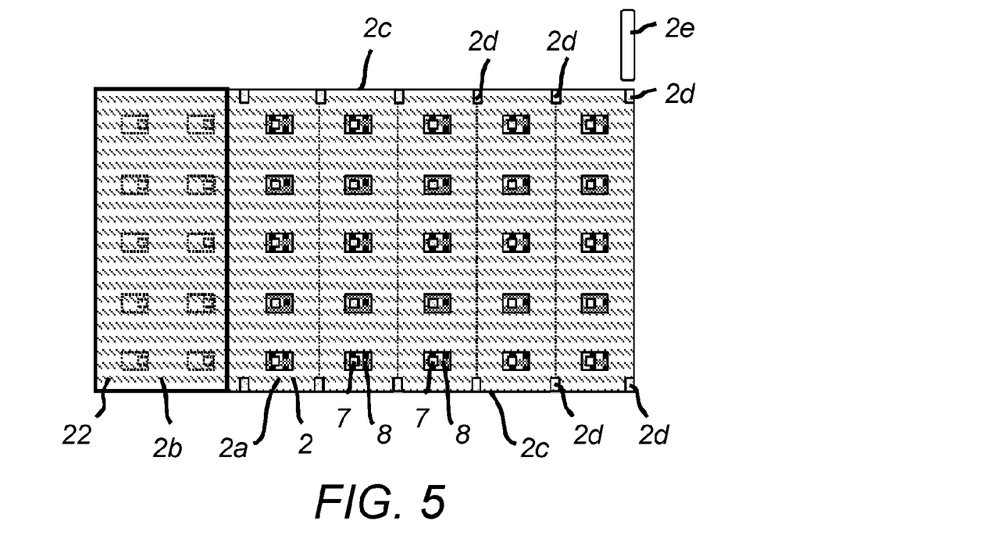
FIG. 5 is a schematic overhead view of a section of PET substrate used in the construction of the product of FIG. 1.

Turning briefly to FIG. 5, which is a schematic overhead view of a section of the PET substrate 2 drawn out from the roll 22, the wireless communication chips 7 are arranged in an array, and surface-mounted on the first surface 2a of the substrate 2. Accordingly, whilst the wireless communication chips 7 and antennae 8 have a very low profile, they do still protrude from the first surface 2a by a not-insignificant amount. The reverse surface 2b of the substrate 2 does not support any wireless communication chips 7 or antennae 8.

The rolls, 22, 24, 26 may be created at or provided to the stock fabrication plant 20 in accordance with process step 40a of FIG. 4.

Referring back to FIG. 3, on the first processing line the stock fabrication plant 20 comprises a fluid adhesive applicator 23 that applies a layer of fluid adhesive 3 onto the first surface 2a of the substrate layer 2 which supports the plurality of wireless communication chips 7 and antennae 8.

In accordance with step 40b this enables bonding of the substrate 2 to the second surface 4a of first paper stock 4 via a laminator 21. Advantageously, the fluid adhesive is able to flow around the wireless communication chips 7 and the antennae 8. This flow action can be encouraged by compressing the substrate 2 and the first paper stock 4 together before or as they pass through the laminator 21. This allows the irregularities caused by the protruding wireless communication chips 7 and the antennae 8 to be evened-out by the fluid adhesive 3. Thus, when the adhesive sets, bonding the PET substrate layer 2 to the first paper stock 4, the resulting outer surface 4a of the first paper stock 4 will be substantially smooth, obviating subsequent printing flaws. Furthermore, the wireless communication chips 7 are well-protected, firstly by being sandwiched between the first paper stock 4 and the substrate layer 2, and secondly by the surrounding fluid adhesive 3 which, when set, forms a mantle around the wireless communication chips 7 and antennae 8.

The first processing line of the stock fabrication plant 20 further comprises a glue applicator 25a for applying the pressure-activated adhesive to the second surface 2b of the substrate layer 2. This glue applicator is conventional—for example, such a glue applicator is used by Mohawk Fine Papers, Inc. to produce papers with pressure-activated glue applied to one side (marketed commercially as "Mohawk Pressure Sensitive").

On the second processing line, a similar glue applicator 25b can be used to apply the same pressure-activated adhesive 5 to the first surface 6a of the second paper stock 6 fed out from its respective roll 26. Thus, the glue applicators 25a, 25b can be used to carry out process step 40c.

After a coating of pressure-activated adhesive has been applied at each of the first and second processing lines, respective cutting apparatus 27a, 27b divide the rolls into respective printing sheets 1a, 1b. Thus, in accordance with process step 40d, the first processing line creates a stack 10a of first printing sheets 1a which incorporate the first paper stock 4, the substrate layer 2, wireless communication chips 7 and antennae 8. Similarly, in accordance with process step 40e the second processing line creates a stack 10b of second printing sheets 1b incorporating the second paper stock. Each printing sheet 1a, 1b has a printing side, and a pressure-activated adhesive side.

Each stack 10a, 10b can be then distributed to a printing facility 30 for the second stage of the process 30a. This involves using a printer 31 (for example, an HP Indigo digital printer) to print, in sequence, on to the glueless printing side of alternate printing sheets 1a, 1b—in accordance with process step 40f. For convenience and ease of processing, each stack 10a, 10b may be loaded into respective printing trays of the printer 31.

In accordance with process step 40g, the printer 31 interleaves the printing sheets 1a, 1b and orients them such that the pressure-activated adhesive side of two corresponding printing sheets 1a, 1b face one another in the combined stack of printed sheets 10c.

Alternatively, the printing sheets may be pre-interleaved, loaded into a single printer tray and processed so that their orientation is preserved in the resulting printed stack 10c. As a printer will not generally be configured to print only on the reverse of a sheet, the printer may need to be configured to "print" to both sides of the sheet, but in such a way that the side of each printing sheet 1a, 1b coated with the pressure-activated adhesive remains blank with all content printed on the glueless printing side. Generally, this will involve amending the original print job to include a number of blank pages equivalent to the number of printed pages, arranged alternately after and before each printed page.

In accordance with process step 40h, a registration device 32 is used to bring the stack of printed sheets 10c into proper registration with each other. Furthermore, in accordance with process step 40i, a press 33 is used to apply pressure and so bond together corresponding printing sheets 1a, 1b within the stack 10c through activation of the pressure-activated adhesive 5.

It will be noted that the choice of pressure-activated adhesive 5 needs to satisfy one main requirement—this is that printing onto the unglued printing surfaces of the first and second printing sheets 1a, 1b will not be affected by it. In addition to the printing step of the process, it is important that the choice of glue will not affect the feeding of sheets in the printer, leading to printing errors or unpredictable printing results. The pressure-activated adhesive 5 therefore needs to be a low tack adhesive that will not prejudice sheet handling by the printer 31 and to be pressure-activated at a sufficiently high pressure that activation will not occur during a printing process. Activation at 300 psi is sufficiently high to prevent a risk of activation during conventional printing—adhesive coated papers with sufficiently low tack and sufficiently high activation pressure for these purposes are produced by Mohawk Fine Papers, Inc. as described above (e.g. Mohawk Pressure Sensitive, Mohawk Panoramic).

This approach of printing two halves of the product and combining them together afterwards is needed as the final product 1 is itself too thick to be fed through a conventional digital press for printing. The approach taught here, in which the front face and the rear face of the product 1 are printed on separate printing sheets 1a, 1b, with the other faces of each printing sheet being glued together, allows products of this type to be produced without modification to a conventional digital press. A prior art approach is known for producing a postcard product—as described at http://www-.convertiblesolutions.com/products/fold-n-go/double-thick-impact-card, this approach uses a single printed sheet which is then folded at a perforation line—but this does not provide the degree of registration required for a high quality business card product and constrains the available post-processing of the assembled paper.

Advantageously, the process steps 40h and 40i may be conducted simultaneously such that the stack 10c of printed sheets are brought into registration with one another at the same time as they are compressed.

Figure 6:
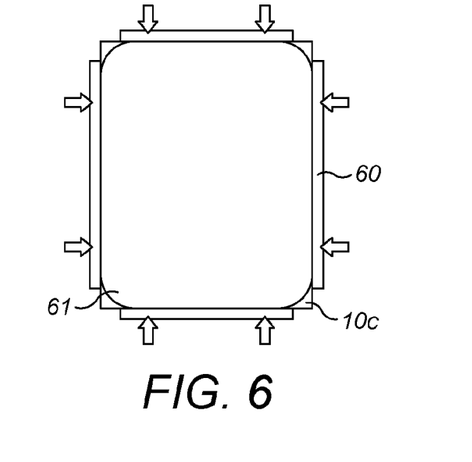
FIGS. 6 and 7 are detailed schematic views of components of the system shown in FIG. 3 which are used in the construction of the product of FIG. 1.

Referring to FIG. 6, a registration device 60 is used to ensure that the side boundaries of the stack 10c of printed sheets are as smooth as possible, so that each respective pair of sheets 1a, 1b in the stack 10c are in good alignment with each other. This registration is then maintained between two sheets 1a, 1b during which pressure is applied by a press member 61 to activate the glue and actuate the bonding between two sheets 1a, 1b.

Referring back to FIGS. 3 and 4, when each pair of sheets 1a, 1b has been bonded together, NFC tags embedded therein can be written to via NFC writing apparatus 35 in accordance with process step 40j as will be described in greater detail below.

Figure 7:
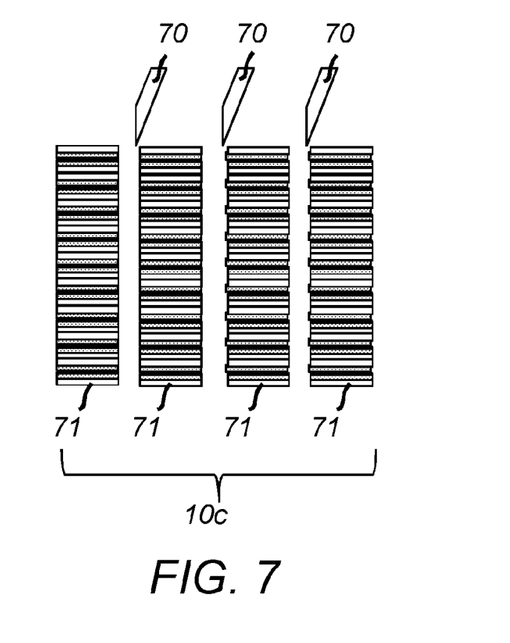

The bonded sheets are then fed into a cutting and packaging apparatus 34 which cuts the bonded sheets into the desired end product 1 and organises and packs them appropriately. The printer 31 and cutting and packaging apparatus 34 may for example be comprised in a system adapted to produce business cards according to the applicant's "Printfinity" process, as described in the Applicant's earlier patent publication number WO 2007/129102. The organisation of printed content may be determined by processes indicated in WO 2007/129102 by appropriate software applications running on suitable servers and clients—represented generically here by computer 39 and network connection to the printer 31 and cutting and packaging apparatus 34. The disclosure of this prior application is incorporated by reference herein to the extent permitted by applicable law. Similarly, the cutting and packaging apparatus 34 may comprise guillotine blades 70 as shown in FIG. 7 and described in more detail in the Applicant's co-pending applications PCT/GB2012/000786 and WO 2007/129102 which are arranged to separate the stack 10*c* using vertical cuts to create card stacks 71. Each card stack 71 provides a set of business cards for one user according to a desired print pattern (these could be identical cards for a single user, or could follow any approach desired by the user, for example with content varying from card to card).

One key differentiator of the present invention from the business cards and manufacturing processes described in the Applicant's co-pending applications PCT/GB2012/000786 and WO 2007/129102 is the provision of a wireless communication chip 7, in particular an NFC chip, and its corresponding antenna within each product 1. This presents additional challenges that need to be addressed as will now be described.

Firstly, it is important to ensure that each business card has embedded within it an undamaged wireless communication chip 7 and antenna 8. Thus, during the manufacturing process steps shown in FIG. 4 using the system 11 of FIG. 3—especially those involving the dividing of stock into sheets 1*a*, 1*b* or subdividing combined sheets into products 1—it is particularly important to determine the position of each wireless communication chip 7 and antenna 8 so that the cutting and printing operations can be performed in correct registration with, or relative to, the position of a respective wireless communication chip 7 and antenna 8.

Referring to FIG. 5, to aid this process, the roll of NFC stock 22 is prefabricated so that the wireless communication chips 7 and antennae 8 are positioned on the surface 2*a* of the substrate 2 at predetermined distance relative to one another and also the sides 2*c* of the roll 22. Moreover, each chip-antenna pair is widely spaced from another (and the edges of the substrate) to provide reasonable tolerances to ensure that misalignments during cutting processes will not cause damage to the chips 7 or antennae 8. This represents a departure from traditional NFC stock fabrication in which it is desirable to maximise the size and number of NFC tags supported by a common substrate so as to minimise substrate wastage. Accordingly, in traditional NFC stock fabrication, multiple NFC tags that are supported by a common substrate are frequently positioned relatively close together—i.e. the distance spacing the antennae of two adjacent NFC tags is generally of a similar order, or less, than the width or length of the area occupied by the antennae themselves. Similarly, the distance between an edge of the substrate and an antenna of an NFC tag is also generally less than the width or length of the area occupied by the antenna. However, in the context of the present invention, it is more beneficial to more widely space the NFC tags from one another and also the edges of the substrate layer; ideally at a distance greater than the width or length of the area occupied by the antennae 8.

Additionally, the NFC stock 22 is prefabricated so that position markers 2*d* are provided on the substrate 2, each being located adjacent to one of the sides 2*c* of the roll 22, each being regularly spaced from a neighbouring position marker 2*d*, and each at a predetermined location relative to the wireless communication chips 7 and antennae 8. In particular, the position markers 2*d* are located along notional gridlines between neighbouring chip-antenna pairs 7, 8.

The position markers 2*d* are constructed from the same metallic foil as the antennae 7 and can advantageously be formed during the same process that forms the antennae 7 (e.g. an etching process) during the fabrication of the NFC stock 22.

The positioning of the position markers 2*d* facilitates automatic detection via one or more metal detectors 2*e* positioned at the border of a path followed by the substrate layer 2 enabling the position of the chip-antenna pairs 7, 8 to be determined—and moreover, enabling components of the system 11 to ensure that the substrate 2 is cut through at a safe position, avoiding damage to the chip-antenna pairs 7, 8.

Such a determination can be carried out even if the positions of the chip-antenna pairs 7, 8 are obscured by the first and/or second paper stocks 4, 6. Thus, during process step 40*d*, the NFC stock 22 and co-bonded first paper stock 24 can be reliably divided into sheets 1*a* as the cutting apparatus 27*a* can be controlled by the determination made by the metal detector 2*e*. Similarly, during process step 40*k*, the guillotines 70 may be guided by another metal detector (not shown)—although this is not necessarily required once a sheet 1*a* of a standard size has been generated from process 2*a*; the guillotines may simply be guided from the edges of the combined sheets 1*a*, 1*b* which are of a predetermined size.

In alternatives, the positions of the chip-antenna pairs may be determined by scanning for them directly using metal detectors or even wireless readers such as NFC reader/writers.

In the present embodiment, the predetermined sheet size of each of the first and second printing sheets 1*a*, 1*b* is 320 mm×460 mm. Naturally, this also applies to the sheet formed by combining two respective first and second sheets. Each of these combined sheets supports a 5×5 array of chip-antenna pairs 7, 8—as is shown in FIG. 5. (Accordingly, the width of each roll 22, 24, 26 is 320 mm, and the spacing between consecutive position markers 2*d* along the edges 2*c* of the NFC stock roll 22 is 92 mm).

Thus, in the present embodiment, each combined sheet yields twenty-five business card products 1, each having sandwiched within it a single wireless communication chip 7 and corresponding antenna 8. Whilst a sheet size of 320×460 mm equally divided into twenty-five sections of size 64×92 mm, in practice, the size of each final trimmed and printed business card 1 is approximately 84 mm×55 mm/3.30"×2.16". This is to provide a suitable bleed area around each business card.

Additionally, in the present embodiment, the typical so-called "weight" of each of the first and second paper stocks is around 250-400 gsm (grams per square meter), with a thickness of around 10-16 pts (around 0.25-0.4 mm). The final business card product 1 incorporating the substrate layer 2 and wireless communication chip 7 is typically around 600-800 gsm with a thickness of 32-36 pts (approx. 0.8-0.9 mm).

Naturally, in alternatives, the dimensions and properties of the paper stocks and the final product may vary. However, the general aim of the processes 20*a*, 30*a* is to produce a final product 1 having a thickness and/or weight far beyond the handling capabilities of the digital press. For reference, in the present embodiment, the HP indigo printing press is typically able to handle paper having a weight of up to 400-500 gsm and up to a thickness of 18 pts.

Referring back to FIGS. 3 and 4, the process step 40*j* of writing digital information to each NFC tag/wireless communication chip 7 using NFC writing apparatus 35 will now be described in greater detail.

All the discussion below relates to NFC as the wireless communication technology used—as the skilled person will appreciate, other technologies (such as Bluetooth) could, in principle, be employed. Furthermore, the description below refers almost exclusively to "chips"—however, where appropriate, it should be understood that each of these chip is equivalent to the aforementioned wireless communication chip 7 which is attached to a corresponding antenna 8, even if these are omitted from the description and associated FIGS. 8 to 12.

Pre-Written Embedded Chips

Figure 8:
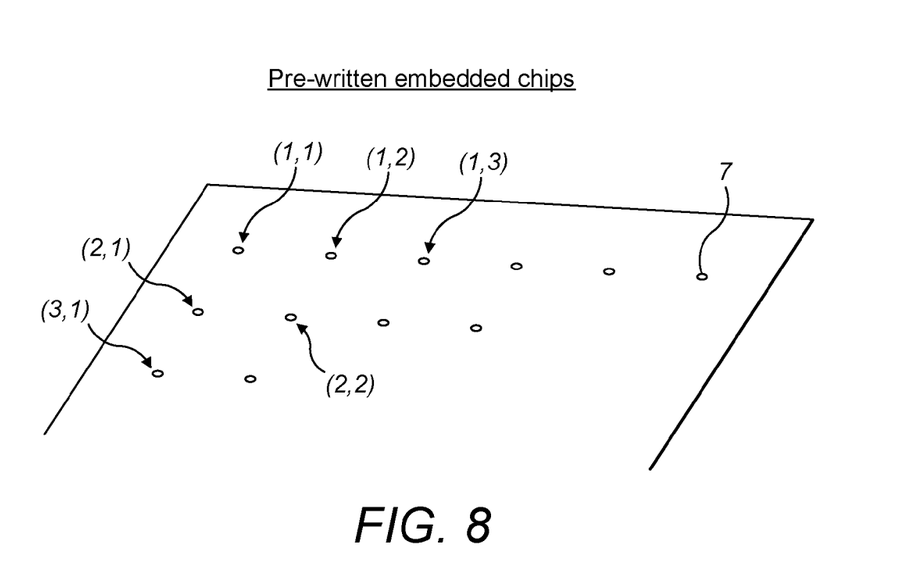
FIG. 8 shows an embodiment of the invention using chips written with co-ordinate information.

The chips 7 will have their coordinates written to them—this is shown in FIG. 8. This can occur during the prefabrication process (e.g. during the provision/creation process step 40*a*) or during the production of individual sheets 1*a* during process 40*d*.

This will allow a reading or writing device 35 to query a sheet 1*a* for all the chips within it, and cycle through each chip querying it for its location within that printing sheet 1*a* (whether or not it is bonded to a corresponding printing sheet 1*b*). For example, an individual chip within a sheet with 5×5 grid of chips could be queried for its location. It could return its co-ordinates—say, (2,5)—allowing the writer to look up the specific data that should be written to that specific chip.

These approaches allow each business card to be provided with a unique identifier, and allow content to be predetermined for each individual card. This allows business cards to be manufactured using the advantageous processes described in the applicant's aforementioned patent application WO 2007/129102, which describes the manufacture of multiple business cards personalised over a print run.

Data writing aspects are discussed as follows. Different approaches are discussed for writing data into the NFC chips. In some approaches, the data is written for a single sheet at a time. In other approaches, the data is written for multiple sheets. Some approaches involve two steps—first a co-ordinate is provided for each chip relative to the paper, and then this co-ordinate is used for the purpose of writing data specific to that business card into the chip.

Single Sheet Writing

For all forms of single sheet writing, the sheet being written to first needs to be identified. One way to do this is to provide the sheet with a barcode (e.g. along a border that will eventually be trimmed out of the final product). This can be scanned to identify the content on that sheet. In alternatives, different sheet identification means may be provided. For example, image recognition software may be used to determine the sheet based on the images printed onto it—for example, the specific business card design. Irrespective of the approach used, once a sheet has been correctly identified, the correct digital data can then be matched to each sheet. Different approaches to doing this will now be described.

Flash Writing

Figure 9:
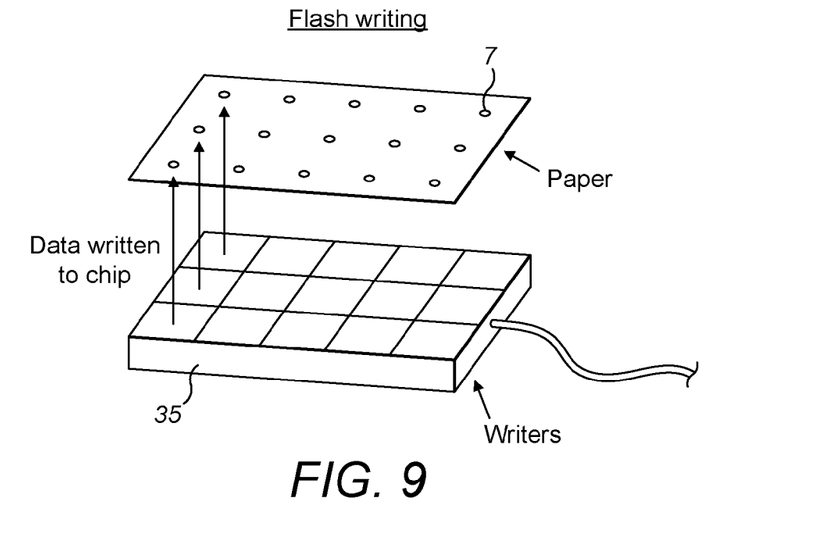
FIG. 9 shows an embodiment of a method of writing data to a sheet of paper containing multiple chips using a simultaneous writing approach.

This approach is shown in FIG. 9. When a sheet containing multiple NFC chips is placed on a writing platform, a grid of readers/writing units will simultaneously write data to all the NFC chips. NFC readers and writers, as well as NFC chips, are commercially available products. The platform may include shielding to prevent interference between two or more units that are in close proximity.

Pattern Writing

Figure 10:
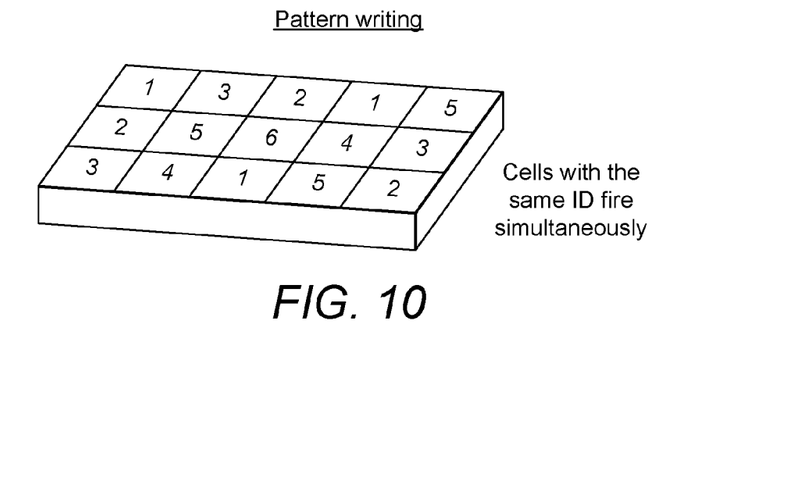
FIG. 10 shows an embodiment of a method of writing data to a sheet of paper containing multiple chips using a sequential writing approach.

This approach is shown in FIG. 10, and is designed to provide simultaneous writing without the need for shielding. When a sheet containing multiple NFC chips is placed on the writing platform, a grid of readers/writing units will fire in a predetermined sequence. The sequence will be calculated to give the optimum number of simultaneous writes, whilst maintaining the minimum required distance between each of the units to prevent interference.

Coordinate Writing

Figure 11:
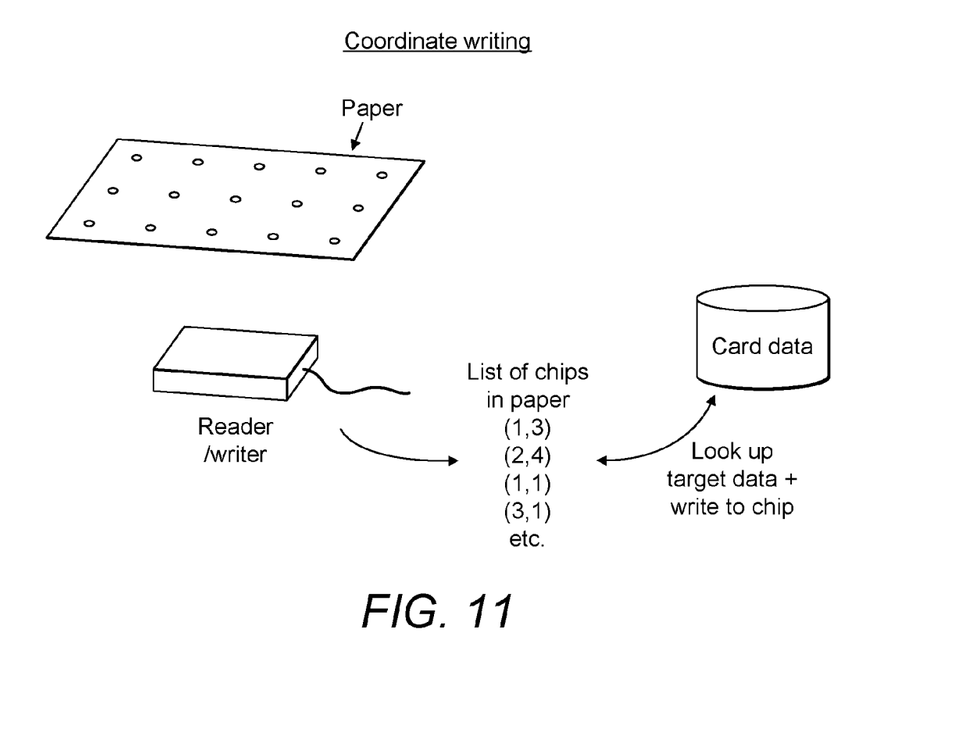
FIG. 11 shows an embodiment of a method of writing data to a sheet of paper containing multiple chips using a co-ordinate based writing approach.

This approach is shown in FIG. 11 and involves two stages of a writing process. In a first stage, the chip is written with a coordinate representing its position on the paper (this may be done at any stage before writing of the main card data, as this information relates only to the sheet and not to the eventual card content—for example, the paper may be fabricated with chips pre-programmed with their coordinates. When a sheet containing multiple NFC chips is placed on the writing platform, the reading/writing unit will query the paper for a list of chips that are embedded within it. Each of the chips has been prewritten with their coordinates within the sheet of paper during the manufacture. The writer will then run though the list of chips, writing the correct content based on the location of the chip within the sheet. As coordinate information is used to establish the information to be written to each chip, the chips can be written to reliably. Other techniques (such as pattern writing) can be used together with this approach to provide simultaneous writing for greater throughput.

Single Sheet in-Line Writing

These approaches may be used with the sheet stopped at a platform with an area matching that of the paper, or they may be used as the paper comes off the printing press and passes over a reading/writing platform. The platform may, for example, scan a barcode to identify the data to be written to the chips—this may then be written using one of the above methods. This provides for a relatively compact arrangement.

Multi-Sheet Writing

Figure 12:
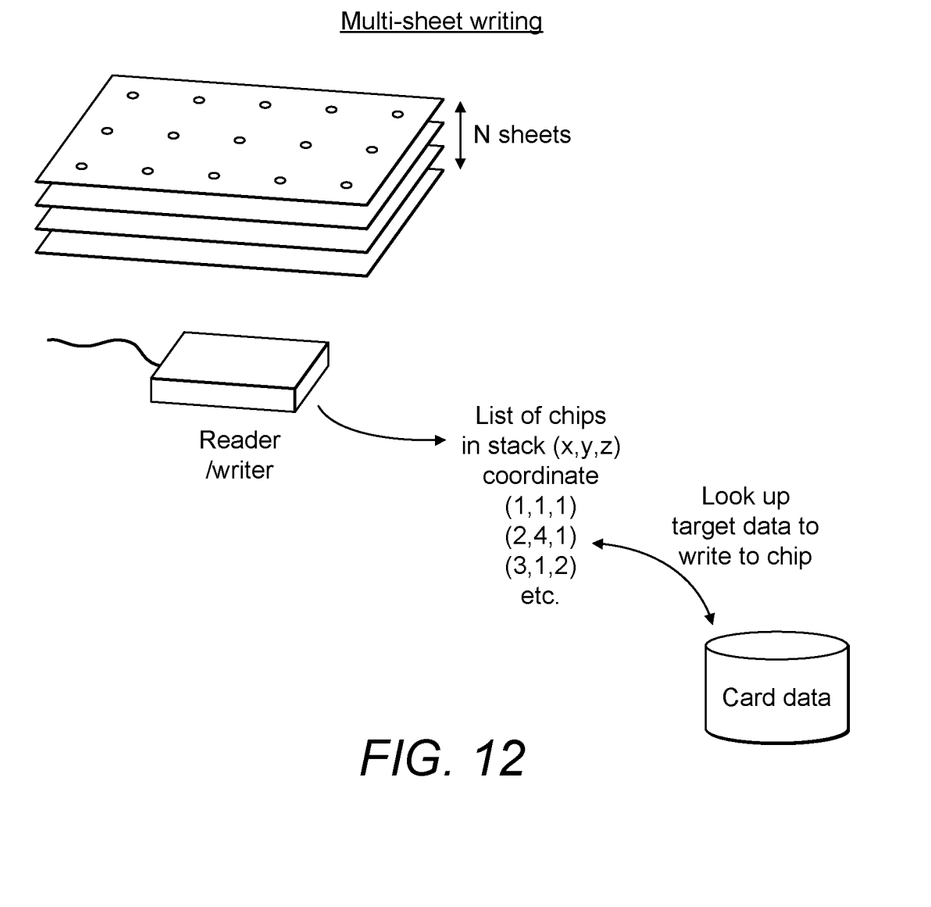
FIG. 12 shows an embodiment of a method of writing data to chips in multiple sheets of paper using a co-ordinate based writing approach.

In other approaches, multiple sheets may be written at the same time. An effective way to do this is to use a multi-page stack of sheets containing chips with pre-written 3D coordinates—x and y coordinates may simply represent a relative position of a chip within one sheet, with a z coordinate representing a sheet and its position in a stack of paper. This pre-writing of coordinates may occur during the paper manufacture stage, as discussed above. This approach is shown in FIG. 12. The stack is placed on the reading/writing platform, whereupon the paper is queried for a list of chips within the paper. The writing process will then run through the list of chips, writing the correct content based on the location of the chip within the stack of paper.

Card tracking and data management aspects are discussed below.

Tracking of Cards

Each individual card will have a unique identifier, such as a URL, embedded on the NFC chip. When the card is accessed, the scanning device will retrieve the data stored at the URL. When a request to access the URL is made it will be possible to capture:

the IP address of the device which will allow us determine a rough (city level) location;
the date and time the card was scanned;
the number of times the card has been scanned;
the number and type of different devices used to scan the card.

In addition to the above, it will also be possible to tell:
Which order, pack, and specific card were used. This will allow:
the user to identify which are the most effective designs to encourage a recipient to scan the card;
the user to identify where a specific card travels to;
the card provider to determine the conversion rate of printed cards to scanned cards;
the card provider to determine the conversion rate for cards belonging to an individual customer.

Card as Physical Key to Data

The cards can act as a physical key to grant permission to access data stored on the web. By handing someone a card, you are giving them access to that data. This could be used to access your most up to date contact information, or to link to a promotion or a ticket.

For end data under control of the data owner (located for example in the cloud), the owner of that data will be able to rescind access at card level, pack level, or across the board, at any time—for example before or after a card is distributed.

As the person skilled in the art will appreciate, many modifications and variations may be made to the embodiments described here while remaining within the scope of the invention as claimed.

The invention claimed is:

1. A method of producing a multiple ply printed product comprising:
providing a substrate layer having a first surface supporting at least one wireless communication chip and a second surface, reverse to the first surface;
providing a first paper stock having a first surface and a second surface;
performing a first bonding operation to substantially bond together the first surface of the substrate layer and the second surface of the first paper stock, thereby to sandwich the wireless communication chip between the first paper stock and the substrate layer;
providing a second paper stock having a first surface and a second surface;
printing a plurality of business cards on at least one of: the first surface of the first paper stock and the second surface of the second paper stock;
performing a second bonding operation to bond together, in registration, the first surface of the second paper stock and the second surface of the substrate layer to form a multiple ply printed product; and
prior to the printing:
forming a first printing sheet from the bonded substrate layer and first paper stock, the first printing sheet having a printing surface defined by the first surface of the first paper stock, and a non-printing surface defined by the second surface of the substrate layer; and
forming a second printing sheet from the second paper stock, the second printing sheet having a printing surface defined by the second surface of the second paper stock, and a non-printing surface defined by the first surface of the second paper stock;
wherein the first surface of the substrate layer supports a plurality of wireless communication chips and each printed business card corresponds to a respective wireless communication chip;
the printing is carried out by a digital press;
the first and second printing sheets are of a thickness up to 18 pts; and
the formed multiple ply printed product is of a thickness of greater than 18 pts; and
the printing comprises printing, separately, onto the respective printing surfaces of the first and second printing sheets, and the second bonding operation comprises bonding together the non-printing surfaces of the first and second printing sheets.

2. The method of claim 1, further comprising applying a pressure-activated adhesive to at least one of the second surface of the substrate layer and the first surface of the second paper stock;
wherein the second bonding operation comprises bonding together the first surface of the second paper stock and the second surface of the substrate layer under pressure.

3. The method of claim 2, wherein the pressure-activated adhesive is activated at a pressure of at least 300 psi.

4. The method of claim 1, wherein the first and second printing sheets are formed by cutting respective first and second rolls to a predetermined size.

5. The method of claim 1, wherein the first and second printing sheets are of a common, predetermined size thereby to enable their bonding together in registration.

6. The method of claim 1, comprising:
providing a pressure-activated adhesive between or on the non-printing surfaces of the first and second printing sheets;
printing a stack of first and second printing sheet pairs in a sequence to orient the non-printing surfaces of each pair towards one another;
bringing the sheets of the stack into registration with one another; and
applying pressure to the stack to bond each of the first and second printing sheet pairs to one another thereby to form a stack of bonded sheets.

7. The method of claim 1 further comprising:
determining the location of the at least one wireless communication chip; and
automatically controlling at least one subsequent method step in response to the determined location of the at least one wireless communication chip.

8. The method of claim 1, wherein each business card is printed at a location on the sheet corresponding to a determined location of a respective wireless communication chip.

9. The method of claim 1, further comprising writing digital data to the or each wireless communication chip, wherein the digital data that is written to each of the plurality of wireless communication chips is specific to the business card to which that wireless communication chip relates.

10. A method of manufacturing business cards comprising: providing a sheet of card comprising a plurality of wireless communication chips at predetermined locations; printing a plurality of business cards on the sheet, each business card comprising no more than one wireless communication chip, writing digital information specific to that business card to the wireless communication chip of the business card, and separating the business cards in the sheet of card from each other.

11. A method as claimed in claim 10, wherein the writing of digital information specific to a business card is carried out sheet-by-sheet and wherein an identifier is provided for each sheet to allow determination of the sheet being written to.

12. A method as claimed in claim 11 wherein the chips in one sheet are written to by a matching reader and a matching writer arrayed on a writing platform.

13. A method as claimed in claim 10, wherein each chip in a sheet is provided with coordinate data representing the position of that chip in the sheet.

14. A method as claimed in claim 10, wherein each chip is provided with coordinate data representing both a sheet number for a sheet containing that chip and the position of that chip in that sheet.

15. A method as claimed in claim 14, wherein writing takes place simultaneously or in one process to chips in multiple sheets in a stack of sheets.

16. A paper product sheet comprising an array of wireless communication chips embedded in the sheet, wherein each of the wireless communication chips comprises a memory containing a coordinate representing a position of that wireless communication chip on the sheet.

17. A paper product sheet as claimed in claim 16, wherein the coordinate also represents a sheet number or position in a sheet stack.

\* \* \* \* \*

UNITED STATES PATENT AND TRADEMARK OFFICE
CERTIFICATE OF CORRECTION

PATENT NO. : 9,796,162 B2  
APPLICATION NO. : 14/783696  
DATED : October 24, 2017  
INVENTOR(S) : Thorogood It is certified that error appears in the above-identified patent and that said Letters Patent is hereby corrected as shown below:

On the Title Page

In Item (57), under "ABSTRACT", in Column 2, Line 16, delete "layer," and insert -- layer --, therefor.

In the Specification

In Column 2, Line 32, delete "product" and insert -- product, --, therefor.

In Column 6, Line 22, delete "bar code," and insert -- barcode, --, therefor.

In Column 7, Line 43, delete "DESCRIPTION" and insert -- DETAILED DESCRIPTION --, therefor.

In Column 9, Line 2, delete "second surface 4a" and insert -- second surface 4b --, therefor.

In Column 12, Line 6, delete "antennae 7" and insert -- antennae 8 --, therefor.

In Column 12, Line 7, delete "antennae 7" and insert -- antennae 8 --, therefor.

In Column 12, Lines 28-29, delete "process 2a;" and insert -- process 20a; --, therefor.

In Column 12, Line 67, delete "indigo" and insert -- Indigo --, therefor.

In Column 14, Line 17, delete "content" and insert -- content) --, therefor.

In Column 14, Line 24, delete "though" and insert -- through --, therefor.

In Column 14, Line 62, delete "determine" and insert -- to determine --, therefor.

Signed and Sealed this  
Tenth Day of April, 2018

Andrei Iancu  
*Director of the United States Patent and Trademark Office*

In the Claims

In Column 15, Line 48, in Claim 1, delete "printing;" and insert -- printing: --, therefor.

In Column 15, Line 65, in Claim 1, delete "pts; and" and insert -- pts; --, therefor.